(12) United States Patent
Krishnamoorthi et al.

(10) Patent No.: US 12,445,075 B2
(45) Date of Patent: Oct. 14, 2025

(54) METHOD AND APPARATUS FOR AN ISOLATED DC/DC CONVERTER

(71) Applicant: Cummins Inc., Columbus, IN (US)

(72) Inventors: Santhosh Krishnamoorthi, Indianapolis, IN (US); Bradford K. O. Palmer, Ham Lake, MN (US); Dakshina S. Murthy-Bellur, Plymouth, MN (US); Minyu Cai, Maplewood, MN (US)

(73) Assignee: Cummins Inc., Columbus, IN (US)

( * ) Notice: Subject to any disclaimer, the term of this patent is extended or adjusted under 35 U.S.C. 154(b) by 184 days.

(21) Appl. No.: 18/030,667

(22) PCT Filed: Jul. 12, 2021

(86) PCT No.: PCT/US2021/041258
§ 371 (c)(1),
(2) Date: Apr. 6, 2023

(87) PCT Pub. No.: WO2022/125147
PCT Pub. Date: Jun. 16, 2022

(65) Prior Publication Data
US 2023/0378895 A1 Nov. 23, 2023

Related U.S. Application Data

(60) Provisional application No. 63/124,417, filed on Dec. 11, 2020.

(51) Int. Cl.
*H02M 7/5387* (2007.01)
*B60L 58/20* (2019.01)
*H02P 27/06* (2006.01)

(52) U.S. Cl.
CPC ................. *H02P 27/06* (2013.01)

(58) Field of Classification Search
CPC ...... B60L 50/51; B60L 58/20; B60L 2210/40; B60L 2210/30; B60L 2220/58;
(Continued)

(56) References Cited

U.S. PATENT DOCUMENTS

| | | | |
|---|---|---|---|
| 7,176,653 B2 * | 2/2007 | Jahkonen | H02J 3/46 |
| | | | 318/803 |
| 7,408,794 B2 | 8/2008 | Su | |

(Continued)

FOREIGN PATENT DOCUMENTS

| | | |
|---|---|---|
| WO | 2001043265 A1 | 6/2001 |
| WO | 2017125204 A1 | 7/2017 |
| WO | 2020091750 A1 | 5/2020 |

OTHER PUBLICATIONS

International Search Report and Written Opinion for International patent application No. PCT/US2021/041258, filed Jul. 12, 2021, mailed Oct. 20, 2021.

*Primary Examiner* — Gabriel Agared
(74) *Attorney, Agent, or Firm* — Faegre Drinker Biddle & Reath LLP

(57) ABSTRACT

A power supply for use with an N-phase multiphase machine comprises an inverter, an isolation stage and a rectifier The inverter is configured to be coupled to a DC power supply and includes N machine switch circuits for providing N-phase machine drive signals to the multiphase machine in response to N-phase machine drive commands, and an auxiliary switch circuit for providing an auxiliary AC output in response to auxiliary control commands. The isolation stage coupled to the auxiliary switch circuit and generates an isolated AC output. The rectifier is coupled to the isolation stage to rectify the isolated AC output and provide an auxiliary DC supply output.

19 Claims, 4 Drawing Sheets

(58) Field of Classification Search
CPC .......... H02M 1/0095; H02M 3/33573; H02M 7/5387; H02M 1/007; H02M 1/0074; H02J 1/082; H02J 1/002; H02J 2310/48; H02J 7/1492; H02J 2207/20; H02P 27/06

See application file for complete search history.

(56) References Cited

U.S. PATENT DOCUMENTS

| | | |
|---|---|---|
| 7,638,904 B2 | 12/2009 | Shoji et al. |
| 8,411,473 B2 | 4/2013 | Cheng |
| 2007/0064459 A1* | 3/2007 | Renken .................. H02P 27/06 363/131 |
| 2009/0261793 A1 | 10/2009 | Urakabe et al. |
| 2012/0120697 A1 | 5/2012 | Cuk |
| 2017/0008405 A1 | 1/2017 | Bojarski et al. |
| 2017/0305283 A1 | 10/2017 | Huh et al. |
| 2018/0123352 A1 | 5/2018 | Hunt et al. |
| 2018/0241337 A1 | 8/2018 | Zou et al. |
| 2020/0016991 A1* | 1/2020 | Miliani ................. H02M 7/797 |
| 2021/0313791 A1* | 10/2021 | Chon ..................... H02M 7/08 |

\* cited by examiner

METHOD AND APPARATUS FOR AN ISOLATED DC/DC CONVERTER

CROSS-REFERENCE TO RELATED APPLICATIONS

The present application is a U.S. national stage and claims priority to International Patent Application No. PCT/US2021/041258, filed Jul. 12, 2021, which claims priority to U.S. Provisional Patent Application 63/124,417, filed Dec. 11, 2020, and entitled "ISOLATED DC-DC CONVERTER IN A MULTIPHASE MACHINE SYSTEM," the complete disclosures of which are expressly incorporated by reference herein.

FIELD

This disclosure relates generally to multiphase machine systems. Disclosed embodiments include an isolated DC-DC converter.

BACKGROUND

Multiphase alternating current (AC) machine systems such as motor and generator systems are used in a wide variety of applications including industrial settings and powertrains for motor vehicles. Motor systems of these types include a multiphase AC motor, inverter and motor control system. In response to an input command, the motor control system causes the inverter to apply power from a high voltage energy source, such as a battery, to the motor in a controlled manner.

There remains, however, a continuing need for improved multiphase machine systems and components. Systems and components that can provide enhanced functionality to the applications in which they are used would be advantageous. Systems and components that can efficiently provide those advantages would be particularly desirable.

SUMMARY

Disclosed embodiments include improved isolated DC-DC power supplies that can be provided in connection with a multiphase machine system. One example is a power supply for use with an N-phase multiphase machine. The power supply may comprise: an inverter configured to be coupled to a DC power supply, including: N machine switch circuits for providing N-phase machine drive signals in response to N-phase machine drive commands; and one or more auxiliary switch circuits for providing an auxiliary AC output in response to auxiliary control commands; and an output stage coupled to the one or more auxiliary switch circuits to convert the auxiliary AC output to an isolated DC supply output.

In embodiments, the output stage may include: an isolation stage coupled to the one or more auxiliary switch circuits for providing an isolated AC output; and a rectifier coupled to the isolation stage to rectify the isolated AC output and provide the DC supply output.

In any or all of the above embodiments, the N machine switch circuits and the one or more auxiliary switch circuits comprise one or more transistors. In any or all of the above embodiments, each of the N machine switch circuits and the one or more auxiliary switch circuits comprise two series-connected transistors.

Any or all of the above embodiments may further comprise an enclosure, and the N machine switch circuits and the one or more auxiliary switch circuits are housed within the enclosure. Any or all of these embodiments may further comprise a circuit board, and the N machine switch circuits and the one or more auxiliary switch circuits are mounted to the circuit board.

In any or all of the above embodiments the isolation stage may comprise a transformer. In embodiments, the transformer comprises a step-down transformer.

Any or all of the above embodiments may further comprise a controller coupled to the inverter for generating the N-phase machine drive commands and the auxiliary control commands. In embodiments, the controller independently generates the N-phase machine drive commands and the auxiliary control commands. In any or all of these embodiments the controller simultaneously generates the N-phase machine drive commands and the auxiliary control commands.

In any or all of the above embodiments the power supply may further comprise a feedback device for providing a feedback signal representative of characteristics of a load or storage system coupled to receive the DC supply output; and the controller is coupled to the feedback device and provides the auxiliary control commands based on the feedback signal.

In any or all of these embodiments, the inverter is configured to be coupled to a first voltage DC power supply; and the output stage is configured to produce a second voltage DC supply output, wherein the second voltage is less than the first voltage.

In any or all of these embodiments, N=3; the inverter includes one auxiliary switch circuit; and the output stage comprises a half-wave stage. In any or all of these embodiments, N=6; the inverter includes two auxiliary switch circuits; and the output stage comprises a full-wave stage.

Another example includes a controller for a motor/generator system of the type including an inverter including N machine phase switch circuits and one or more auxiliary switch circuits, an N-phase multiphase machine coupled to the inverter, and a DC-DC power supply coupled to the inverter. In embodiments, the controller comprises: inputs configured to receive a machine control input and an auxiliary control input; outputs configured to couple N-phase machine drive commands to the inverter and auxiliary converter commands to the inverter; and a processor configured to generate the N-phase machine drive commands based on the machine control input and to generate the auxiliary converter commands based on the auxiliary control input.

In embodiments, the processor is configured to independently generate the N phase machine drive commands and the auxiliary converter commands. In any or all of these embodiments the processor is configured to simultaneously generate the N phase machine drive commands and the auxiliary converter commands.

In any or all of these embodiments the inputs may be further configured to receive machine feedback from the N-phase machine; and the processor is configured to generate the machine drive commands based on the machine control input and the machine feedback. In any or all of these embodiments the inputs may be further configured to receive load/storage device feedback representative of a load or storage device to which the DC-DC power supply is coupled; and the processor is configured to generate the auxiliary converter commands based on the auxiliary control input and the load/storage device feedback.

DETAILED DESCRIPTION

Figure 1:
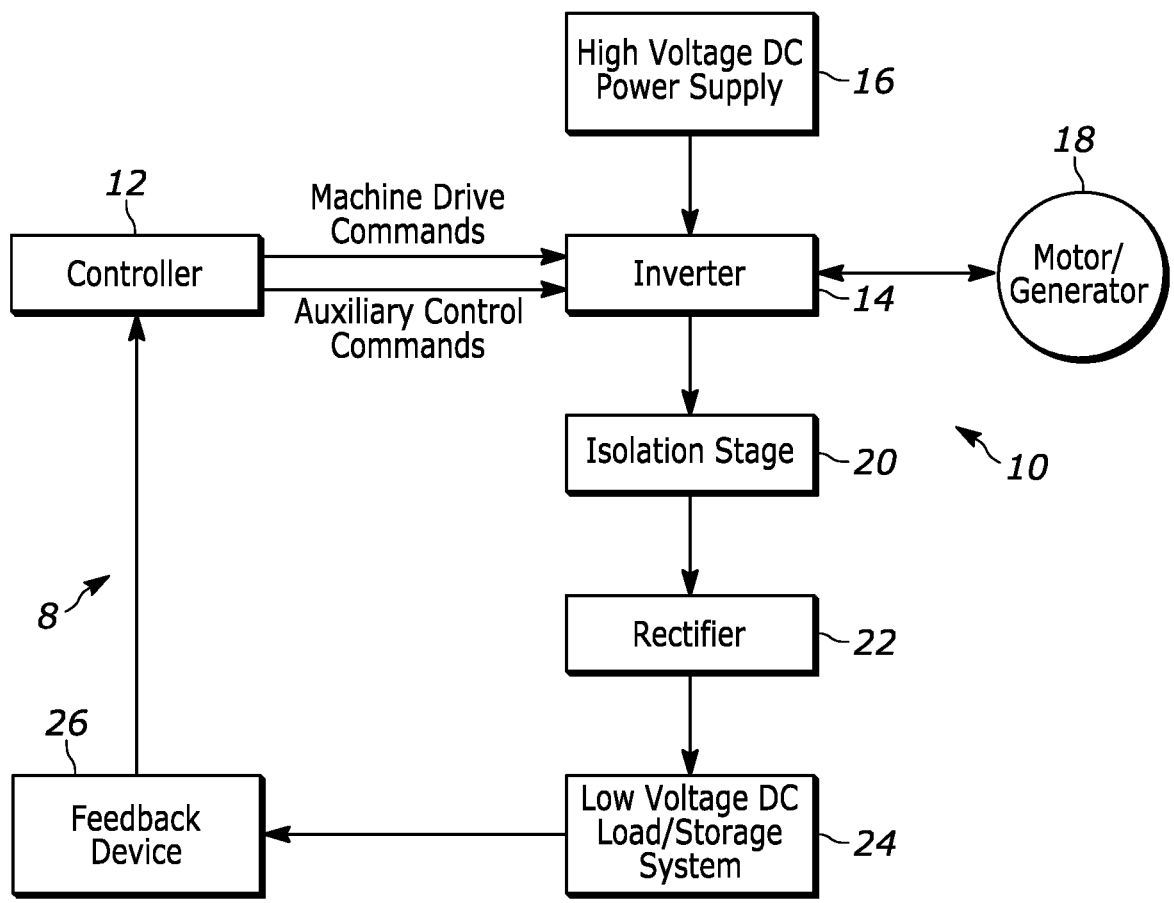
FIG. 1 is a diagrammatic illustration of a motor/generator system including a DC-DC power supply, in accordance with embodiments.

FIG. 1 is a diagrammatic illustration of a motor/generator system 8 including an isolated DC-DC power supply 10 in accordance with embodiments. As shown, system 8 includes a controller 12, inverter 14, DC power supply 16 and an electric machine such as a generator and/or motor 18. DC power supply 16 provides a first or relatively high voltage supply potential. In embodiments, DC power supply 16 may provide supply potentials between 400 volts and 800 volts, for example. In embodiments, for example, system 8 is incorporated into the powertrain of a plug-in or other electric vehicle including one or more AC traction motors 18, and DC power supply 16 provides a voltage (e.g., 600 volts) required for operation of the traction motors. Other embodiments of DC power supply 16 provide lesser or greater supply potentials.

Inverter 14 is responsive to machine drive commands or other drive signals from the controller 12, and controls the application of power from the DC power supply 16 to the motor 18. In addition to input control commands such as a torque request, controller 12 may receive motor feedback inputs from the motor 18. In embodiments, for example, controller 12 is coupled to receive motor feedback inputs representative of electrical operating characteristics of the motor 18 provided by current sensors (not shown) and/or mechanical operating characteristics of the motor provided by a resolver system (not shown). In response to the input control commands and the motor feedback inputs, controller 12 generates and provides the machine drive commands in forms that cause the motor 18 to provide the commanded outputs such as torque levels.

As described in greater detail below, the DC-DC power supply 10 comprises components included and/or associated with the inverter 14, as well as an output stage including isolation stage 20 and rectifier 22. DC power produced by the DC power supply 10 may be applied to a load/storage system 24. In embodiments such as those described above where the motor system 8 is incorporated into an electric vehicle, for example, DC-DC power supply 10 may produce a second or relatively low voltage potential auxiliary DC supply that is less than the supply potential of the DC power supply 16. The DC supply produced by the DC-DC power supply 10 can, for example, be used to power DC load/storage systems 24 including other relatively low voltage auxiliary components or systems of the electric vehicle, such as the instrument system or to charge low voltage batteries or ultracapacitors. Other embodiments include other load/storage systems powered by the DC-DC power supply 10. In embodiments, the DC-DC power supply 10 produces auxiliary DC supply voltage potentials such as twelve volts or twenty-four volts or forty-eight volts, for example. Other embodiments of power supply 10 produce lesser or greater supply potentials.

The components included and/or associated with the inverter 14 that form part of the DC-DC power supply 10 are responsive to auxiliary converter control commands or other power supply control signals produced by the controller 12, and control the application of power from the DC power supply 16 to the isolation stage 20. Controller 12 produces the auxiliary converter control commands in response to power supply input control commands or signals, such as current, voltage or power requests, representative of the desired DC supply to be generated by the DC-DC power supply 10. In addition to the power supply control commands, controller 12 may receive load/storage system feedback inputs from the load/storage system 24 to which it is coupled. The illustrated embodiments of the DC-DC power supply 10 include one or more feedback devices 26 that provide information representative of electrical or other operating characteristics of the DC load/storage system 24. In embodiments, for example, feedback devices 26 may be voltage, current or temperature sensors. In response to the power supply input control commands and the load/storage system feedback inputs, controller 12 generates and provides the auxiliary converter control commands in forms that cause the DC-DC power supply 10 to provide the desired DC supply outputs.

In embodiments, motor 18 is a multi-phase (i.e., N-phase, where N>1) AC electric machine having a rotor and stator windings. For example, motor 18 may be an interior permanent magnet (IPM) motor, an induction motor, or a synchronous motor. Although described in connection with a motor 18, other embodiments alternatively or in addition include a generator, and the controller 12 can control the switching of the power produced by such a generator to the power supply 16 or other source (e.g., in the case of regenerative braking).

In embodiments, controller 12 is configured to receive a motor control input command specifying a desired amount of torque to be produced by motor 18. Controller 12 processes the torque control input command and any motor feedback signals such as those described above to produce the voltage or machine drive commands that are applied to the inverter 14. The machine drive commands may be pulse-width modulated (PWM) signals. Controller 12 produces the machine drive commands based on a control algorithm. In embodiments, for example, controller 12 implements flux-weakening (FW) and maximum-torque-per-ampere (MTPA) control algorithms to produce the machine drive commands as a function of the input command and feedback signals. FW and MTPA algorithms are generally known and any such conventional or otherwise known algorithm suitable for the application of motor system 8 and/or motor 18 can be used.

Inverter 14 processes the machine drive commands and applies the commanded voltages to the windings (not shown) of the motor 18 that results in rotation of the motor shaft. Other than the differences described herein relating to the components included in and/or associated with the DC-DC power supply 10, inverter 14 can be of any known or otherwise conventional design.

Figure 2:
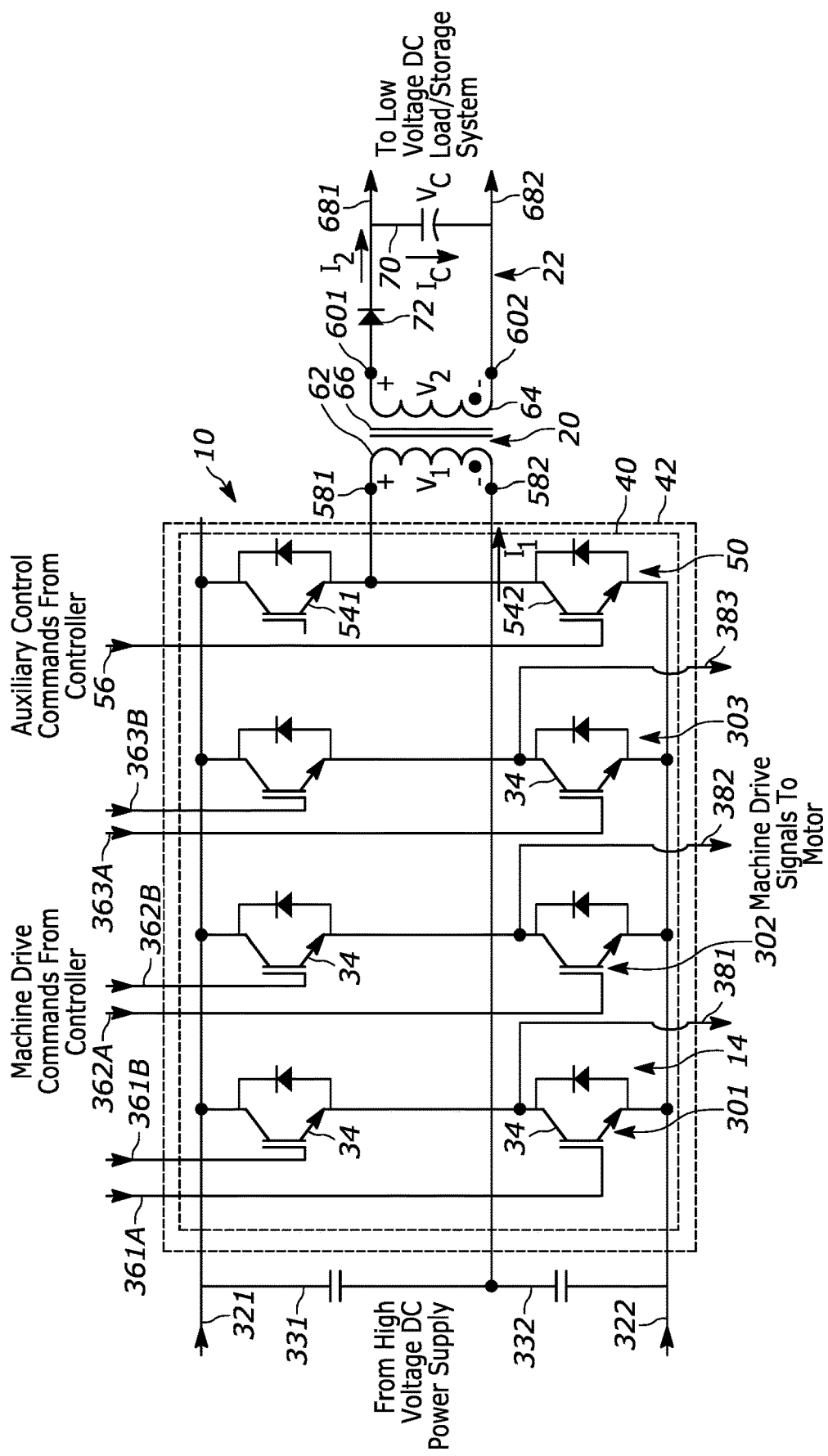
FIG. 2 is a detailed schematic illustration of components of the DC-DC power supply including a 3-phase machine and inverter, in accordance with embodiments.

FIG. 2 is a detailed schematic illustration of embodiments of the three-phase (i.e., N=3) DC-DC power supply, including components of the inverter 14. The illustrated embodiments of the inverter 14 are configured for use with a three-phase generator or motor 18. Accordingly, the inverter 14 includes three machine phase switch circuits or legs 301, 302 and 303 coupled between a pair of supply inputs 321 and 322. The supply inputs 321 and 322 are configured to be coupled to the high voltage DC power supply 16. In the illustrated embodiments the supply inputs 321 and 322 are coupled by a series-connected pair of capacitors 331 and 332. The illustrated embodiments of the machine phase switch legs 301, 302 and 303 each include a pair of controllable switches connected in series between the supply inputs 321 and 322. The controllable switches include transistors 34 in the illustrated embodiments. Transistors 34 have their sources and drains connected in series between the supply inputs 321 and 322. The control inputs of the phase switch legs 301, 302 and 303, which comprise the gates of the transistors 34 in the illustrated embodiments, are coupled to machine control inputs 361A and 361B, 362A and 362B, and 363A and 363B, respectively, to receive the machine drive commands from the controller 12. Phase switch legs 301, 302 and 303 include machine supply outputs 381, 382 and 383, respectively, which are coupled between the transistors 34 of the associated phase switch legs in the illustrated embodiments. Phase switch legs 301, 302 and 303, produce the voltage or machine drive signals at the machine supply outputs 381, 382 and 383, respectively, in response to the machine drive commands. A diode is shown connected between the source and drain of each transistor 34 in the embodiments illustrated in FIG. 2.

In embodiments, the controllable switches such as transistors 34 and/or other components of the inverter 14 configured to provide the machine drive signals are fabricated on or mounted to a common substrate such as circuit board 40. In other embodiments the transistors 34 and/or other components of the inverter 14 configured to provide the machine drive signals are fabricated on or mounted to two or more substrates or circuit boards. The one or more substrates or circuit boards such as 40 to which the controllable switches such as transistors 34 are mounted may be housed or enclosed within an enclosure 42, in embodiments.

DC-DC power supply 10 includes an auxiliary switch circuit or leg 50 coupled between the supply inputs 321 and 322. In the illustrated embodiments the auxiliary switch leg 50 includes a pair of controllable switches connected in series between the supply inputs 321 and 322. The controllable switches include transistors 541 and 542 in the illustrated embodiments, and have their sources and drains connected in series between the supply inputs 321 and 322. The control inputs of the auxiliary switch leg 50, which comprises the gate of the transistor 542 in the illustrated embodiment, is coupled to an auxiliary control input 56 to receive the auxiliary control commands from the controller 12. Transistor 541 is not coupled to the controller 12 in the illustrated embodiment. The auxiliary switch leg 50 includes auxiliary output 581. In the illustrated embodiments the auxiliary output 581 is coupled between the transistors 541 and 542 of the auxiliary switch leg 50. An auxiliary output 582 is coupled between the capacitors 331 and 332. The capacitor bank provided by capacitors 331 and 332 provides a DC link with an intermediate point and divides the high DC voltage across the capacitors (e.g., a midpoint, dividing the high voltage DC equally, into Vdc/2). In the illustrated embodiments the auxiliary output 582 is connected to the intermediate point created by the capacitors 331 and 332.

Auxiliary switch leg 50 produces an auxiliary AC output at the auxiliary output 581 in response to the auxiliary converter control commands. In embodiments such as those illustrated in FIG. 2 and described above, the peak voltage value of the AC output produced by the auxiliary switch leg 50 will be one-half of the potential provided by the DC power supply 16. A diode is shown connected between the source and drain of each transistor 541 and 542 in the embodiments illustrated in FIG. 2

In embodiments, the controllable switch such as transistor 542 and/or other components of the inverter auxiliary switch leg 50, such as transistor 541, configured to provide the auxiliary AC output, are fabricated on or mounted to the same substrate such as circuit board 40 as the components of the machine phase switch legs 301, 302 and 303. The controllable switch and/or other components of the auxiliary phase switch leg 50 can thereby be integrated with three machine phase switch circuits or legs 301, 302 and 303. In other embodiments the controllable switch such as transistor 542 and/or other components of the inverter auxiliary switch leg 50, such as transistor 541, configured to provide the auxiliary AC output, are fabricated on or mounted to two or more substrates or circuit boards that are different than the substrates or circuit boards for the machine phase switch circuits or legs 301, 302 and 303. The one or more substrates or circuit boards such as 40 to which the controllable switches such as transistors 541 and/or 542 of the auxiliary switch leg 50 are mounted may be housed within the enclosure 42 that encloses the phase switch legs 301, 302 and 303 of the inverter 14. In other embodiments the one or more circuit boards to which the controllable switches such as transistors 541 and/or 542 are mounted may be housed within an enclosure (not shown) different than the enclosure 42. In embodiments, the auxiliary switch leg 50 is an additional or N+1th leg on the inverter 14 (e.g., one more switch leg than is needed to provide the machine drive signals for the N-phase machine such as motor 18 of the system 8).

Isolation stage 20 includes inputs coupled to the outputs 581 and 582 and outputs 601 and 602. Isolation stage 20 receives the auxiliary AC output from the auxiliary switch leg 50 and provides an isolated AC output at the outputs 601 and 602. The illustrated embodiments of the isolation stage 20 include a transformer having input windings 62 and output windings 64 separated by a core 66. In embodiments isolation stage 20 produces isolated AC outputs having voltage potentials less than the potentials of the auxiliary AC output received at the inputs. For example, embodiments of the isolation stage 20 produce isolated AC outputs having voltage potentials of twelve to forty-eight volts. Other embodiments of isolation stage 20 produce isolated AC outputs having different potentials. In embodiments, for example, isolation stage 20 can be a step-down transformer to produce isolated AC outputs having potentials less than the potentials of the auxiliary AC outputs received at the inputs. Although shown in FIG. 2 as including a transformer, other embodiments of the isolation stage 20 may include additional and/or other components.

Rectifier 22 includes inputs coupled to the outputs 601 and 602 of the isolation stage 20 and outputs 681 and 682. Rectifier 22 receives the isolated AC outputs from the isolation stage 20 and rectifies and smooths the isolated AC outputs to produce an auxiliary DC supply at the outputs 681 and 682. The illustrated embodiments of the rectifier 22 include a capacitor 70 connected between the outputs 681 and 682 and a diode 72 connected between the input coupled to output 601 of the isolation stage 20 and the output 681. Other embodiments of the rectifier 22 include additional and/or other components. Rectifier 22 can be of any suitable known or otherwise conventional configuration. In the illustrated embodiment, for example, rectifier 22 is a half-wave rectifier.

Figure 3:
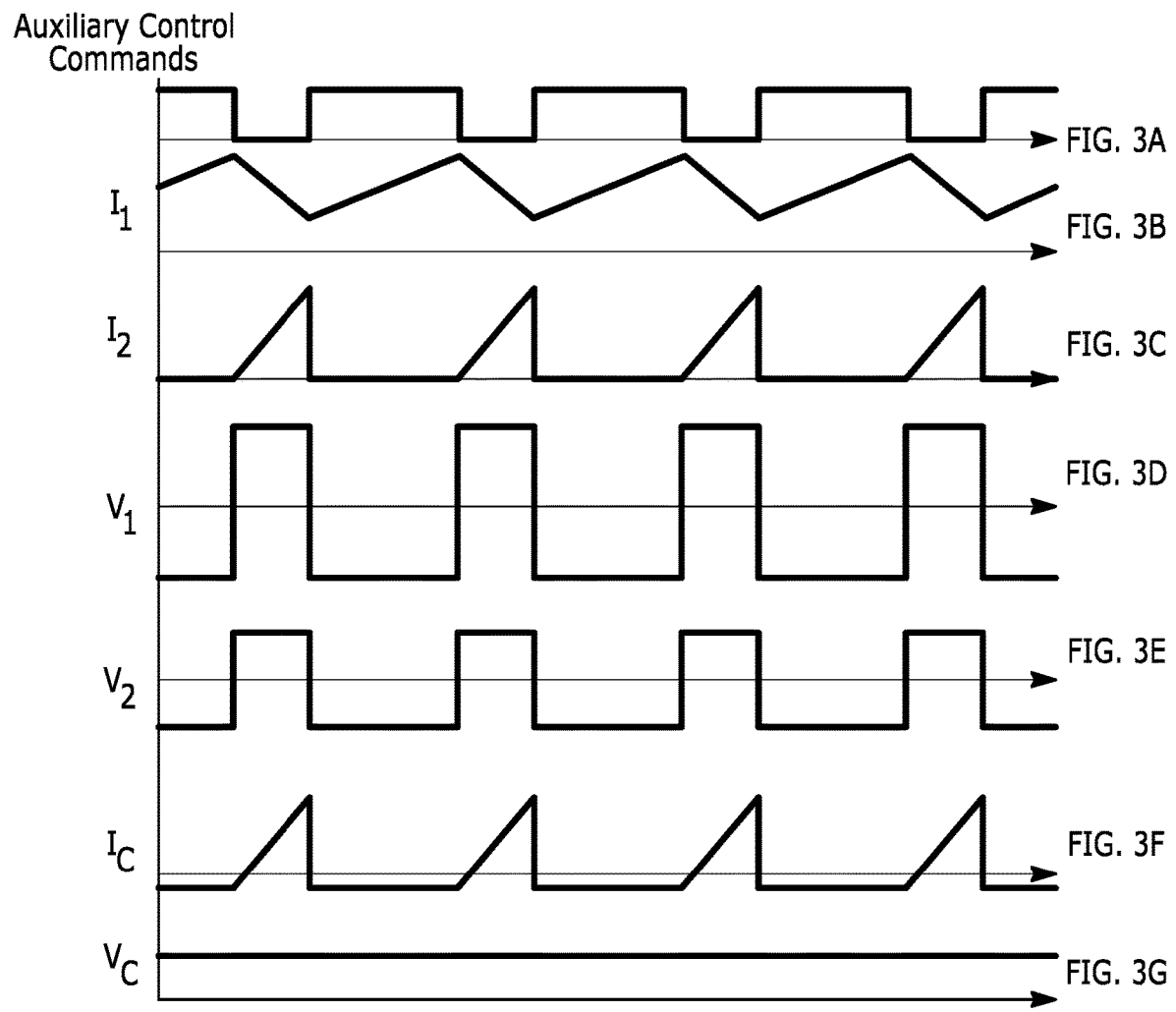
FIG. 3A is a diagrammatic illustration of exemplary auxiliary control commands that can be generated and used in the motor/generator system shown in FIGS. 1 and 2, in accordance with embodiments.
FIG. 3B is a diagrammatic illustration of an exemplary current signal that can be produced at an output of an auxiliary switch leg of the motor/generator system in response to the auxiliary control commands shown in FIG. 3A, in accordance with embodiments.
FIG. 3C is a diagrammatic illustration of an exemplary current signal that can be produced at the output of an isolation stage of the motor/generator system in response to the auxiliary control commands shown in FIG. 3A, in accordance with embodiments.
FIG. 3D is a diagrammatic illustration of an exemplary voltage signal that can be produced at the output of the auxiliary switch leg of the motor/generator system in response to the auxiliary control commands shown in FIG. 3A, in accordance with embodiments.
FIG. 3E is a diagrammatic illustration of an exemplary voltage signal that can be produced at the output of the isolation stage of the motor/generator system in response to the auxiliary control commands shown in FIG. 3A, in accordance with embodiments.
FIG. 3F is a diagrammatic illustration of an exemplary current signal through the output capacitor of the auxiliary DC supply produced at an output of a rectifier stage of the motor/generator system in response to the auxiliary control commands shown in FIG. 3A, in accordance with embodiments.
FIG. 3G is a diagrammatic illustration of an exemplary voltage signal of the auxiliary DC supply produced at the output of the rectifier stage of the motor/generator system in response to the auxiliary control commands shown in FIG. 3A, in accordance with embodiments.

FIGS. 3A-3G can be used in connection with FIGS. 1 and 2 to describe the operation of controller 12 and the DC-DC power supply 10. In embodiments, controller 12 controls the operation of the DC-DC power supply 10, including the auxiliary switch leg 50 of inverter 14, independently of (but optionally during the same time periods of) the machine phase switch legs 301, 302 and 303 that are controlled to operate the motor 18. FIG. 3A shows an example of auxiliary converter control commands that can be produced by the controller 12 and applied to the control input 56 of the auxiliary switch leg 50 of inverter 14. The auxiliary converter control commands can be produced by the controller 12 in response to an input command representative of a desired characteristic of the auxiliary DC supply, such as a desired voltage, current or power level, to be produced by the DC-DC power supply 10. In the illustrated embodiments the auxiliary converter control commands are shown as pulses. FIGS. 3B and 3D are examples of current signals I1 and voltage signals V1, respectively, of the auxiliary AC outputs produced by the auxiliary switch leg 50 and applied to the isolation stage 20 in response to the auxiliary control commands shown in FIG. 3A. FIGS. 3C and 3E are examples of current signals I2 and voltage signals V2, respectively, of the isolated AC outputs produced by the isolation stage 20 and applied to the rectifier stage 22 in response to the auxiliary control commands shown in FIG. 3A. FIGS. 3F and 3G are examples of a current signal IC through capacitor 70 and a voltage signal VC, respectively, of the DC supply at outputs 681 and 682 produced by the rectifier 22 in response to the auxiliary control commands shown in FIG. 3A. As shown by FIG. 3F, the current signals through the capacitor 70 are in the form of pulses. As shown by FIG. 3G, the voltage signals of the DC supply have a constant potential. Depending on the frequency of the current signal pulses and the configuration of the rectifier 22, the voltage signals of the DC supply may have some ripple or variations.

As described above, feedback devices 26 can provide feedback inputs representative of characteristics of the load/storage system 24. In embodiments, for example, the feedback devices 26 provide information on electrical or other operating characteristics of the load/storage system 24. Examples of feedback devices 26 include current and/or voltage sensors that provide feedback information representative of the current and/or voltage of the load/storage system 24. Controller 12 receives the feedback information from the feedback devices 26, and generates the auxiliary control commands based on the feedback information and the input commands representative of the desired operation of the load/storage system 24 based on a control algorithm. In embodiments, for example, controller 12 can process the input commands and the feedback information using one or more of current control mode, voltage control mode or power control mode algorithms to provide the DC supply in a form that results in the desired operation of the load/storage system 24. Conventional or otherwise known algorithms of these types can be implemented by the controller 12. For example peak current mode control, average current mode control or output voltage control algorithms may be implemented in embodiments.

Figure 4:
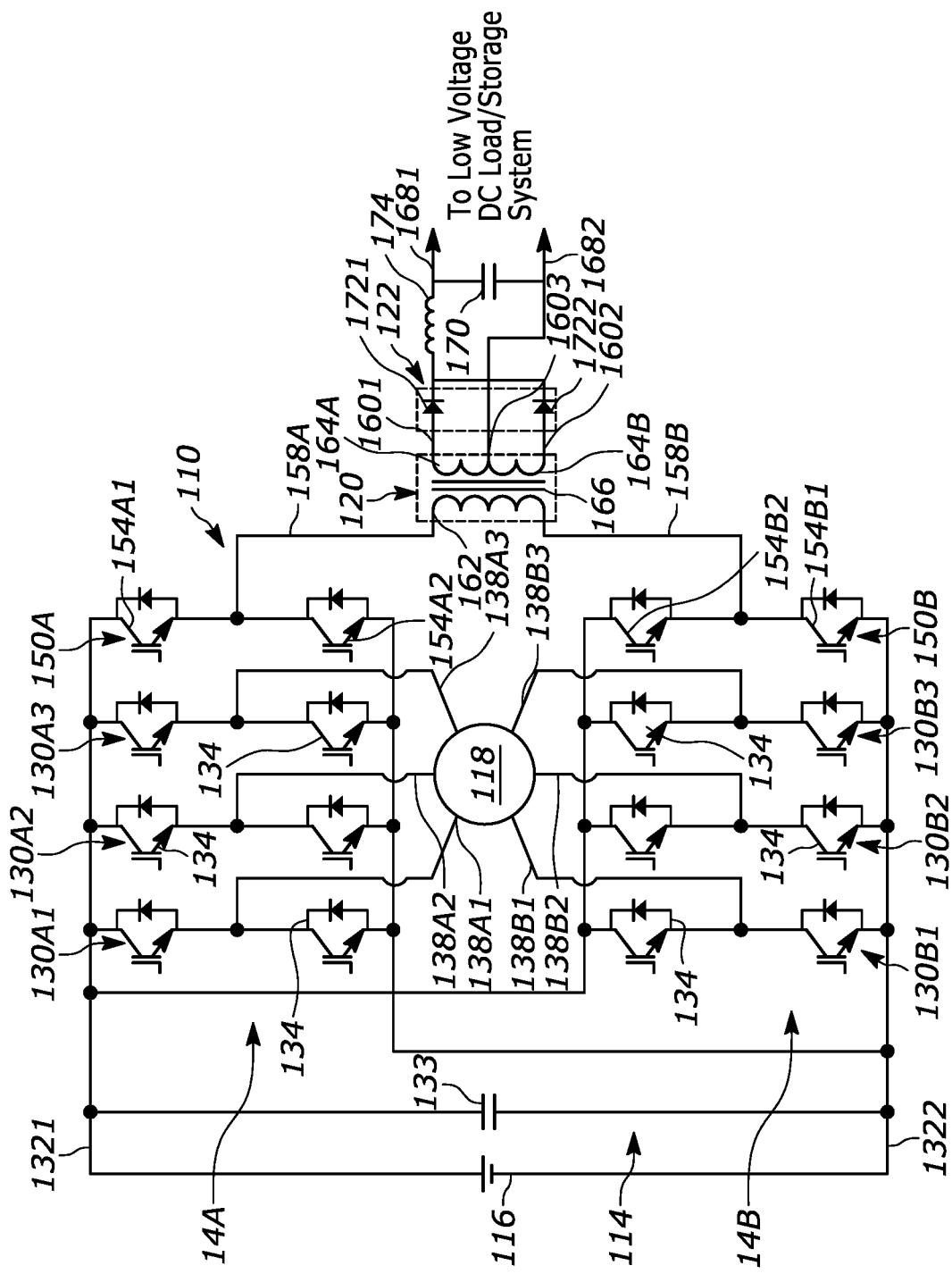
FIG. 4 is a detailed schematic illustration of components of the DC-DC power supply including a 6-phase machine and inverter, in accordance with embodiments.

FIG. 4 is a schematic illustration of a DC-DC power supply 110 together with a 6-phase inverter 114 coupled to a 6-phase motor 118, in accordance with embodiments. As shown, inverter 114 includes a first set 14A of three machine phase switch circuits or legs 130A1, 130A2 and 130A3 coupled between a pair of supply inputs 1321 and 1322, and a second set 14B of three machine phase switch circuits or legs 130B1, 130B2 and 130B3 coupled between the supply inputs 1321 and 1322. Each of the first set 14A and second set 14B of machine phase switch circuits or legs can be configured in a manner substantially the same as or similar to the inverter 14 described above in connection with FIGS. 1 and 2, and similar features are identified by similar reference numbers. The supply inputs 1321 and 1322 are shown coupled to the high voltage DC power supply 116. In the illustrated embodiments the supply inputs 1321 and 1322 are coupled by a capacitor 133. The illustrated embodiments of the machine phase switch legs 130A1, 130A2 and 130A3 and 130B1, 130B2 and 130B3 each include a pair of controllable switches connected in series between the supply inputs 1321 and 1322. The controllable switches include transistors 134 in the illustrated embodiments. Transistors 134 have their sources and drains connected in series between the supply inputs 1321 and 1322. The control inputs of the phase switch legs 130A1, 130A2 and 130A3 and 130B1, 130B2 and 130B3, which comprise the gates of the transistors 134 in the illustrated embodiments, are each coupled to machine control inputs (not shown in FIG. 4) to receive the machine drive commands from the controller 12. Phase switch legs 130A1, 130A2 and 130A3 and 130B1, 130B2 and 130B3 each include machine supply outputs 138A1, 138A2 and 138A3, and 138B1, 138B2 and 138B3 respectively, which are coupled between the transistors 134 of the associated phase switch legs in the illustrated embodiments. Phase switch legs 130A1, 130A2 and 130A3 and 130B1, 130B2 and 130B3, produce the voltage or machine drive signals at the machine supply outputs 138A1, 138A2 and 138A3, and 138B1, 138B2 and 138B3 respectively, in response to the machine drive commands. A diode is shown connected between the source and drain of each transistor 134 in the embodiments illustrated in FIG. 4.

In embodiments, the controllable switches such as transistors 134 and/or other components of the inverter 114 configured to provide the machine drive signals are fabricated on or mounted to a common substrate such as circuit board. In other embodiments the transistors 134 and/or other components of the inverter 114 configured to provide the machine drive signals are fabricated on or mounted to two or more substrates or circuit boards (not depicted in FIG. 4) (e.g., each of sets 14A and 14B are fabricated on or mounted to a separate substrate or circuit board). The one or more substrates or circuit boards to which the controllable switches such as transistors 134 are mounted may be housed or enclosed within an enclosure (not depicted in FIG. 4), in embodiments.

DC-DC power supply 110 includes two auxiliary switch circuit or legs 150A and 150B coupled between the supply inputs 1321 and 1322. As shown, auxiliary switch leg 150A is associated with and coupled to the set 14A of machine phase switch legs, and auxiliary switch leg 150B is associated with and coupled to the set 14B of machine phase switch legs. Auxiliary switch leg 150A may be referred to as a $7^{th}$ leg of the inverter 114. Similarly, auxiliary switch leg 150B may be referred to as an $8^{th}$ leg of the inverter 114.

In the illustrated embodiments each of the auxiliary switch legs 150A and 150B includes a pair of controllable switches connected in series between the supply inputs 1321 and 1322. The controllable switches include transistors 154A1 and 154A2, and 154B1 and 154B2 in the illustrated embodiments, and have their sources and drains connected in series between the supply inputs 1321 and 1322. The control inputs of the auxiliary switch legs 150A and 150B, which comprises the gates of the transistors 154A1 and 154A2, and 154B1 and 154B2 in the illustrated embodiment, is coupled to an auxiliary control input (not depicted in FIG. 4) to receive the auxiliary control commands from the controller 12. The auxiliary switch legs 150A and 150B include auxiliary outputs 158A and 158B, respectively. In the illustrated embodiments, the auxiliary output 158A is coupled between the transistors 154A1 and 154A2 of the auxiliary switch leg 150A, and the auxiliary output 158B is coupled between the transistors 154B1 and 154B2 of the auxiliary switch leg 150B.

Auxiliary switch legs 150A and 150B produce an auxiliary AC output at the auxiliary outputs 158A and 158B in response to the auxiliary control commands. In embodiments such as those illustrated in FIG. 4, the peak voltage value of the AC output produced by the auxiliary switch legs 150A and 150B will have the same potential as that provided by the DC power supply 16. A diode is shown connected between the source and drain of each transistor 154A1, 154A2, 154B1, and 154B2 in the embodiments illustrated in FIG. 4.

In embodiments, one or more or all of the controllable switches such as transistors 154A1 and/or 154A2 and/or other components of the auxiliary switch leg 150A configured to provide the auxiliary AC output are fabricated on or mounted to the same substrate such as a circuit board as the components of the set 14A of machine phase switch legs. In embodiments, one or more or all of the controllable switches such as transistors 154B1 and/or 154B2 and/or other components of the auxiliary switch leg 150B configured to provide the auxiliary AC output are fabricated on or mounted to the same substrate such as a circuit board as the components of the set 14B of machine phase switch legs. The controllable switch and/or other components of each auxiliary phase switch leg 150A or 150B can thereby be integrated with the respective set 14A or 14B of three machine phase switch circuits or legs. In other embodiments the controllable switch and/or other components of the auxiliary switch legs 150A or 150B configured to provide the auxiliary AC output are fabricated on or mounted to two or more substrates or circuit boards that are different than the substrates or circuit boards of the sets 14A and/or 14B of machine phase switch circuits or legs. The one or more substrates or circuit boards to which the controllable switches of the auxiliary switch legs 150A and 150B are mounted may be housed within the enclosure that encloses the sets 14A and/or 14B of phase switch legs of the inverter 114. In other embodiments the one or more circuit boards to which the controllable switches are mounted may be housed within an enclosure different than the enclosure of the sets 14A and/or 14B of machine phase switch legs. In embodiments, the auxiliary switch leg 150A is an additional or N+1th leg on the set 14A of legs of inverter 114 (e.g., one more switch leg than is needed to provide the machine drive signals of the set 14A). Similarly, in embodiments, the auxiliary switch leg 150B is an additional or N+1th leg on the set 14B of legs of inverter 114 (e.g., one more switch leg than is needed to provide the machine drive signals of the set 14B).

Isolation stage 120 includes inputs coupled to the outputs 158A and 158B of the auxiliary switch legs 150A and 150B, and outputs 1601, 1602 and 1603. Isolation stage 120 receives the auxiliary AC output from the auxiliary switch legs 150A and 150B, and provides an isolated AC output at the outputs 1601, 1602 and 1603. The illustrated embodiments of the isolation stage 120 include a center-tap transformer having input windings 162 and output windings 164A and 164B separated by a core 166. In embodiments, isolation stage 120 produces isolated AC outputs having voltage potentials less than the potentials of the auxiliary AC output received at the inputs. For example, embodiments of the isolation stage 120 produce isolated AC outputs having voltage potentials of twelve to forty-eight volts. Other embodiments of isolation stage 20 produce isolated AC outputs having different potentials. In embodiments, for example, isolation stage 20 can be a step-down transformer to produce isolated AC outputs having potentials less than the potentials of the auxiliary AC outputs received at the inputs. Although shown in FIG. 4 as including a transformer, other embodiments of the isolation stage 120 include additional and/or other components.

Rectifier 122 includes inputs coupled to the outputs 1601, 1602 and 1603 of the isolation stage 120 and outputs 1681 and 1682. Rectifier 122 receives the isolated AC outputs from the isolation stage 120 and rectifies and smooths the isolated AC outputs to produce an auxiliary DC supply at the outputs 1681 and 1682. The illustrated embodiments of the rectifier 122 include a capacitor 170, diodes 1721 and 1722, and inductor 174 configured as a full-wave rectifier. Other embodiments of the rectifier 122 include additional and/or other components. Rectifier 122 can be of any suitable known or otherwise conventional configuration.

By the additional auxiliary switch legs (e.g., the $4^{th}$ leg 50 in 3-phase inverter 14 and the $7^{th}$ and $8^{th}$ legs 150A and 150B in the 6-phase inverter 114), the inverters 14, 114 can be configured for use with other components including the isolation stages 20, 120 and rectifiers 22, 122 into an isolated DC-DC converter. The illustrated embodiment of inverter 14 makes use of the lower-side switch (i.e., transistor 542) to provide the auxiliary AC output from the inverter 14. The illustrated embodiments of inverter 114 make use of the first set 14A and second set 14B of switch circuit switches to provide the auxiliary AC output from the inverter 114. Other embodiments include other configurations to provide the auxiliary AC output (e.g., an upper-side switch such as transistor 541). The DC-DC power supplies 10, 110 are unidirectional in the illustrated embodiments (i.e., there are no switches on the output side of the isolation stage 20, 120, and power from the load/storage devices 24 cannot or is not coupled back to the inverter 14, 114). The auxiliary switch legs 50, 150A, 150B in combination with the isolation stages 20, 120 and rectifiers 22, 122 effectively form a flyback converter. The enhanced DC-DC power supply functionality is efficiently provided (e.g., at least in part by the additional switch leg(s) of the inverter). For example, power can be drawn from the high voltage DC supply battery to supply auxiliary needs, and/or can be used to charge a low voltage battery. Additionally, when the multi-phase machine is operating as a generator, such as for example during regenerative braking, excess energy can be stored by charging the low voltage battery or in a supercapacitor bank.

Controller 12 may comprise a processor, a controller, a digital logic circuit and/or a computer. The controller 12 may comprise or be coupled to memory (volatile memory such as RAM, and non-volatile memory such as magnetic memory, ROM and EEPROM), a communication interface (e.g., a wired serial or parallel data bus), an input (such as switches, keypad or communication interface) and an output such as a display. The memory may store software such as instructions representative of algorithms or steps of the methods described herein that are executed by a processor, controller, digital logic circuit and/or computer. The communication interface may comprise a communication module for sending and receiving messages and signals (e.g., input commands) over a network. The communication module may be capable of communication over one or more wireless or wired technologies (e.g., WiFi, Bluetooth, cellular networks, local area networks (LANs) and/or wide area networks (WANs)).

In some applications, power supplies 10 can be used as alternatives to other DC voltage sources that would have been incorporated into the applications or larger systems (e.g., that would have been incorporated into then-conventional versions of the applications). In such applications, the need for one or more other DC sources may be eliminated. For example, the need for one or more auxiliary battery packs in an electric vehicle may be eliminated when power supplies such as 10 are incorporated into the vehicle. In such applications the power supply 10 may be a substitute for other DC power supplies. In other applications, power supplies 10 are incorporated into applications including other DC supply sources.

It is to be understood that the above description is intended to be illustrative, and not restrictive. Many other embodiments will be apparent to those of skill in the art upon reading and understanding the above description. For example, although described in connection with a motor system, other embodiments include other electrical machines, such as multiphase generators. Embodiments may be configured with two auxiliary legs for a three-phase inverter, with one auxiliary leg for a six-phase machine, and one auxiliary leg can be paired with a full-wave rectifier, for example. It is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A power supply for use with an N-phase multiphase machine, comprising:
    an inverter configured to be coupled to a DC power supply, including:
        N machine switch circuits for providing N-phase machine drive signals in response to N-phase machine drive commands; and
        one or more auxiliary switch circuits for providing an auxiliary AC output in response to auxiliary control commands; and
        wherein the inverter is configured to provide the N-phase machine drive signals independently of the auxiliary AC output, to provide the auxiliary AC output independently of the N-phase machine drive signals, and to provide the N-phase machine drive signals simultaneously with the auxiliary AC output; and
    an output stage coupled to the one or more auxiliary switch circuits to convert the auxiliary AC output to an isolated DC supply output.

2. The power supply of claim 1 wherein the output stage includes:
    an isolation stage coupled to the one or more auxiliary switch circuits for providing an isolated AC output; and
    a rectifier coupled to the isolation stage to rectify the isolated AC output and provide the DC supply output.

3. The power supply of claim 1 wherein each of the N machine switch circuits and the one or more auxiliary switch circuits comprise one or more transistors.

4. The power supply of claim 3 wherein each of the N machine switch circuits and the one or more auxiliary switch circuits comprise two series-connected transistors.

5. The power supply of claim 1 and further comprising an enclosure, and wherein the N machine switch circuits and the one or more auxiliary switch circuits are housed within the enclosure.

6. The power supply of claim 1 and further comprising a circuit board, and wherein the N machine switch circuits and the one or more auxiliary switch circuits are mounted to the circuit board.

7. The power supply of claim 6 wherein the isolation stage comprises a transformer.

8. The power supply of claim 7 wherein the transformer comprises a step-down transformer.

9. The power supply of claim 1 and further comprising a controller coupled to the inverter for generating the N-phase machine drive commands and the auxiliary control commands.

10. The power supply of claim 9 wherein the controller is configured to generate the N-phase machine drive commands to provide the N-phase machine drive signals independently of the auxiliary AC output, to generate the auxiliary control commands to provide the auxiliary AC output independently of the N-phase machine drive signals, and to generate the N-phase drive commands and the auxiliary control commands to simultaneously provide the N-phase machine drive signals and the auxiliary AC output.

11. The power supply of claim 10 wherein the controller is configured to simultaneously generate the N-phase machine drive commands and the auxiliary control commands.

12. The power supply of claim 9 wherein:
    the power supply further comprises a feedback device for providing a feedback signal representative of characteristics of a load or storage system coupled to receive the DC supply output; and the controller is coupled to the feedback device and provides the auxiliary control commands based on the feedback signal.

13. The power supply of claim 1 wherein:
the inverter is configured to be coupled to a first voltage DC power supply; and
the output stage is configured to produce a second voltage DC supply output, wherein the second voltage is less than the first voltage.

14. The power supply of claim 1 wherein:
N=3;
the inverter includes one auxiliary switch circuit; and
the output stage comprises a half-wave stage.

15. The power supply of claim 1 wherein:
N=6;
the inverter includes two auxiliary switch circuits; and
the output stage comprises a full-wave stage.

16. A controller for a motor/generator system of the type including an inverter including N machine phase switch circuits and one or more auxiliary switch circuits, an N-phase multiphase machine coupled to the inverter, and a DC-DC power supply coupled to the inverter, comprising:
inputs configured to receive a machine control input and an auxiliary control input;
outputs configured to couple N-phase machine drive commands to the inverter and auxiliary converter commands to the inverter; and
a processor configured to generate the N-phase machine drive commands based on the machine control input and to generate the auxiliary converter commands based on the auxiliary control input, wherein the processor is configured to generate the N-phase machine drive commands to provide the N-phase machine drive signals independently of the auxiliary AC output, to generate the auxiliary control commands to provide the auxiliary AC output independently of the N-phase machine drive signals, and to generate the N-phase drive commands and the auxiliary control commands to simultaneously provide the N-phase machine drive signals and the auxiliary AC output.

17. The controller of claim 16 wherein the processor is configured to simultaneously generate the N phase machine drive commands and the auxiliary converter commands.

18. The controller of claim 16 wherein:
the inputs are further configured to receive machine feedback from the N-phase machine; and
the processor is configured to generate the machine drive commands based on the machine control input and the machine feedback.

19. The controller of claim 16 wherein:
the inputs are further configured to receive load/storage device feedback representative of a load or storage device to which the DC-DC power supply is coupled; and
the processor is configured to generate the auxiliary converter commands based on the auxiliary control input and the load/storage device feedback.

* * * * *